United States Patent
Bihel et al.

(10) Patent No.: US 10,737,775 B2
(45) Date of Patent: Aug. 11, 2020

(54) CONTROL MEMBER, A ROTARY WING AIRCRAFT, AND A METHOD

(71) Applicant: AIRBUS HELICOPTERS, Marignane (FR)

(72) Inventors: Jean-Romain Bihel, Le Rove (FR); Zouhair Sassi, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 384 days.

(21) Appl. No.: 15/826,851

(22) Filed: Nov. 30, 2017

(65) Prior Publication Data

US 2018/0148167 A1 May 31, 2018

(30) Foreign Application Priority Data

Nov. 30, 2016 (FR) .................................... 16 01695

(51) Int. Cl.
| | |
|---|---|
| *B64C 27/56* | (2006.01) |
| *B64D 31/04* | (2006.01) |
| *B64C 13/14* | (2006.01) |
| *B64C 27/82* | (2006.01) |
| *B64C 13/04* | (2006.01) |
| *B64C 11/30* | (2006.01) |

(52) U.S. Cl.
CPC .............. *B64C 27/56* (2013.01); *B64C 13/14* (2013.01); *B64C 27/82* (2013.01); *B64D 31/04* (2013.01); *B64C 11/30* (2013.01); *B64C 13/044* (2018.01); *B64C 13/0421* (2018.01); *B64C 2027/8227* (2013.01)

(58) Field of Classification Search
CPC ......... B64C 27/56; B64C 11/30; B64C 13/14; B64C 13/0421; B64C 13/044; B64C 27/82; B64C 27/59; B64C 2027/8227; B64D 31/04; G05G 1/10
USPC .......................................................... 244/224
See application file for complete search history.

(56) References Cited

U.S. PATENT DOCUMENTS

| | | | |
|---|---|---|---|
| 2,514,212 A | 7/1950 | Jennings | |
| 2,788,676 A * | 4/1957 | Spexarth | F16C 1/16 74/489 |
| 3,545,702 A | 12/1970 | Laville et al. | |

(Continued)

FOREIGN PATENT DOCUMENTS

| | | |
|---|---|---|
| FR | 1518834 A | 3/1968 |
| FR | 3027871 A1 | 5/2016 |
| GB | 790560 | 2/1958 |

OTHER PUBLICATIONS

French Search Report for French Application No. FR 1601695, Completed by the French Patent Office, dated Jul. 3, 2017, 6 pages.

*Primary Examiner* — Claude J Brown
(74) *Attorney, Agent, or Firm* — Brooks Kushman

(57) ABSTRACT

A control member that is operable by a pilot to vary thrust from a thrust system of an aircraft. The control member comprises a stick and a movable assembly including a grip. The grip is linked to the stick via a helical link, rotation of the grip about the stick giving rise to movement in translation of the grip together with the movable assembly along the stick, the grip being movable in translation in both a first direction in translation and in a second direction in translation that is opposite to the first direction in translation.

16 Claims, 3 Drawing Sheets

(56) References Cited

U.S. PATENT DOCUMENTS

| | | | | |
|---|---|---|---|---|
| 3,936,015 A | * | 2/1976 | Dean | B64C 27/56 |
| | | | | 244/234 |
| 4,241,687 A | * | 12/1980 | DuBois | B63H 21/265 |
| | | | | 440/63 |
| 5,340,342 A | * | 8/1994 | Boda | B63H 21/265 |
| | | | | 440/86 |
| 5,370,017 A | * | 12/1994 | Krauer | B62K 23/04 |
| | | | | 474/80 |
| 7,770,490 B1 | * | 8/2010 | Weiss | B62K 11/14 |
| | | | | 74/502.2 |
| 2009/0044653 A1 | * | 2/2009 | Schwulst | B62K 23/04 |
| | | | | 74/488 |

* cited by examiner

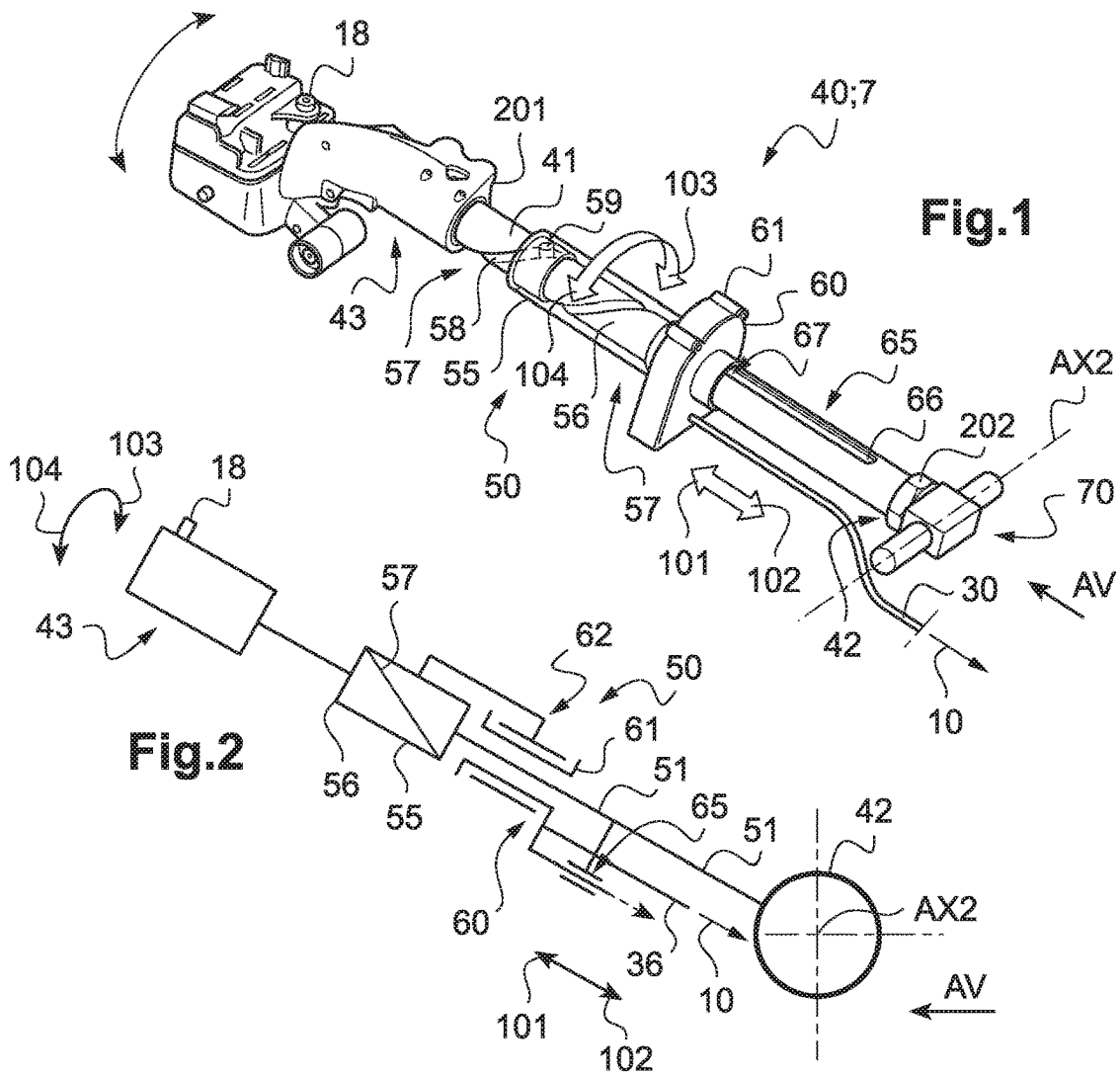
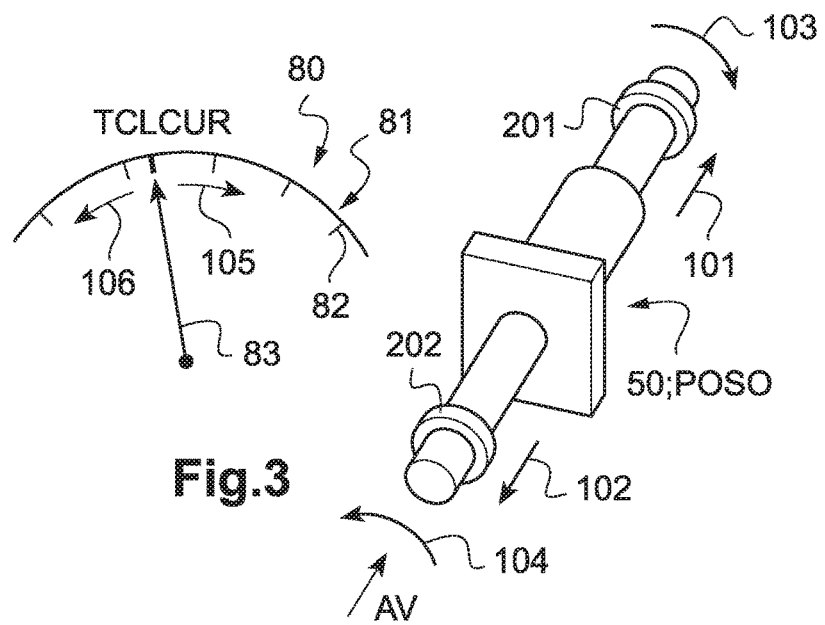

# CONTROL MEMBER, A ROTARY WING AIRCRAFT, AND A METHOD

CROSS-REFERENCE TO RELATED APPLICATIONS

This application claims priority to French patent application No. FR 16 01695 filed on Nov. 30, 2016, the disclosure of which is incorporated in its entirety by reference herein.

BACKGROUND OF THE INVENTION

(1) Field of the Invention

The present invention relates to a control member, to a rotary wing aircraft including such a control member, and to a method applied by the aircraft.

(2) Description of Related Art

A rotary wing aircraft, e.g. of helicopter type, includes at least one main rotor that contributes at least in part to providing the aircraft with lift and propulsion.

In addition, a system enables at least the yaw movement of the aircraft to be controlled.

Under such circumstances, such a helicopter has three piloting axes. A first axis consists in using a first control for controlling the magnitude of the lift vector of the aircraft. A second axis consists in using a second control for controlling the orientation of the lift vector, and a third axis consists in using a third control for controlling the yaw movement of the aircraft.

For example, a helicopter may have a main rotor contributing to its propulsion and lift. Furthermore, a helicopter may include an auxiliary rotor contributing at least to controlling its yaw movement.

Under such circumstances, the aircraft has pilot controls that can be operated by a pilot to control the movements of the aircraft.

Thus, a collective pitch lever serves to control the pitch of the blades of the main rotor collectively in order to vary the lift of the aircraft. A cyclic stick serves to control the pitch of the blades of the main rotor in order to vary the orientation of the lift vector of the aircraft. Finally, pedals serve to vary the pitch of the blades of the auxiliary rotor collectively in order to control the yaw movement of the helicopter.

In another embodiment, a helicopter may have two main rotors, possibly on a common axis.

Under such circumstances, a collective pitch lever serves to control the pitch of the blades of the main rotors collectively in order to vary the lift of the aircraft. A cyclic stick serves to control the pitch of the blades of the main rotors cyclically in order to vary the orientation of the lift vector of the aircraft. Finally, pedals enable the yaw torque exerted by at least one main rotor on the fuselage of the aircraft to be varied, in order to control the yaw movement of the aircraft.

Another type of rotary wing aircraft, known as a "hybrid" aircraft for convenience, has at least one rotor that contributes at least in part to providing the aircraft with lift and propulsion. Furthermore, the aircraft has a device enabling the yaw movement of the aircraft to be controlled. The aircraft also has a thrust system arranged to exert thrust referred to for convenience as "additional" thrust, at least in the direction of advance of the aircraft. This additional thrust is said to be "additional" insofar as this thrust is axially independent of any thrust that might be exerted by the rotary wing.

In addition to the usual three piloting axes, such a hybrid rotary wing aircraft has a fourth piloting axis. This fourth piloting axis consists in using a fourth control to vary the magnitude of the additional thrust.

For example, a hybrid rotary wing aircraft may have a main rotor that contributes at least in part to providing the aircraft with lift and propulsion. Furthermore, the hybrid rotary wing aircraft has two thrust systems, each provided with a respective propeller contributing at least in part to providing the aircraft with propulsion and to controlling the yaw movement of the aircraft.

A collective pitch lever can serve to control the pitch of the blades of the main rotor collectively to vary the magnitude of the lift vector of the aircraft. A cyclic stick can serve to control the pitch of the blades of the main rotor cyclically in order to vary the orientation of the lift vector of the aircraft.

In addition, a thrust control can enable a pilot to vary the mean pitch of the blades of the propellers in order to vary the additional thrust generated jointly by the propellers.

In addition, pedals may enable the distribution of this additional thrust between the two propellers to be varied so as to control the yaw movement of the aircraft by applying different thrusts by means of the propellers. By way of example, the pedals enable a differential pitch to be varied, the pitch of the blades of one propeller being equal to the sum of the mean pitch plus half the differential pitch, while the pitch of the blades of the other propeller is equal to the difference between the mean pitch and half the differential pitch, for example.

Thrust control may be in the form of an electric on/off pilot control. When the thrust control is operated, the thrust control generates an order to increase or reduce the mean pitch of the blades of the propellers. The order is transmitted to actuators in order to modify the pitch of the blades of both propellers in the same way. For example, an actuator is arranged on a mechanical transmission linkage controlling a hydraulic valve, the hydraulic valve feeding a hydraulic actuator suitable for generating a movement of the blades of a propeller.

Documents FR 1 518 834 and GB 790 560 are mentioned solely by way of illustration since those documents do not relate to controlling propellers of a hybrid helicopter.

Document FR 1 518 834 describes a lever control. The lever is movable. The movement is guided by a guide in the form of a guide slot that λ(lambda) shaped. In addition, the lever carries a turnable grip that controls the admission of fuel to a power plant.

Document GB 790 560 describes an aircraft control. That control comprises a tube that is movable in turning about a transverse axis of rotation. The tube is connected to a rod for controlling the collective pitch of the blades of a rotor. Turning the tube then leads to a modification to the collective pitch.

Document U.S. Pat. No. 2,514,212 is also known.

In addition, that control is provided with a rod passing along the tube. The rod extends longitudinally from a grip projecting towards the front of the tube to an end projecting towards the rear of the tube. That end is hinged to a movement system controlling the position of a valve. The grip can turn relative to the tube about a longitudinal axis between a first position and a second position.

When the grip is in the first position, turning the tube about its transverse axis of rotation leads solely to a modification to the collective pitch of the blades of the rotor. In contrast, when the grip is in its second position, turning the tube about its transverse axis of rotation causes both a modification to the collective pitch of the blades of the rotor and a modification to the position of the valve that is controlled by the grip.

Consequently, Documents FR 1 518 834 and GB 790 560 describe controls having turnable grips only.

BRIEF SUMMARY OF THE INVENTION

An object of the present invention is thus to propose a novel control member operable by a pilot and capable in particular of being used to control a thrust of an aircraft.

The invention thus provides a pilot-operated control member, the control member being for controlling a thrust system exerting thrust in an aircraft, the control member comprising a stick and a movable assembly, the movable assembly being arranged on the stick and being movable relative to the stick, the movable assembly including a grip.

Such a thrust system may for example be in the form of a jet or indeed of a propeller.

The grip is linked to the stick by a helical link so that turning the grip about the stick generates movement in translation of the grip together with the movable assembly along the stick, the grip being movable in translation both in a first direction in translation, e.g. for imposing an increase in thrust, and also in a second direction in translation that is opposite to the first direction in translation, e.g. for imposing a decrease in said thrust.

The thrust is considered below, for convenience, as being positive when it enables the aircraft to advance in a direction of advance going from the tail towards the nose of the aircraft, and negative in the opposite situation.

The term "increase" can refer to an increase in thrust. Such an increase may in particular enable the direction of thrust to be reversed by transforming a negative thrust into a positive thrust. An increase in thrust may amount to imparting acceleration to the aircraft in its direction of advance.

The term "decrease" can refer to a decrease in the thrust. Such a decrease may serve in particular to reverse the direction of thrust by transforming a positive thrust into a negative thrust. A decrease in thrust may amount to imposing a deceleration on the aircraft in the direction of advance.

Under such circumstances, the movable assembly of the control member presents a grip that is helically linked on the stick. Such a grip may be in the form of a cylinder that locally surrounds a tube of the stick.

Under such circumstances, the control member does not have a grip that is movable in rotation only, unlike Document FR 1 518 834, for example, or that is movable only in translation. The grip moves both in rotation and in translation as a result of the helical link. As the grip is turned around the stick, the grip is moved in translation.

Thus, a pilot can move the grip intuitively in order to increase or decrease the thrust exerted by each thrust system controlled by the control member.

In addition, a pilot taking hold of the grip in one hand can exert a large force on a transmission mechanism connected to the movable assembly. Specifically, the total force exerted by the pilot on the transmission mechanism results from a combination of a turning force developed by the pilot's hand to turn the grip, plus a force developed in translation exerted by the pilot's arm. Such a combination of forces cannot be achieved with an ordinary grip, and can be found to be advantageous for moving elements that require large control forces.

In addition, a helically-linked grip can be positioned accurately by the pilot relative to the stick, unlike a grip that is movable only in translation.

Finally, the control means embodied by the movable assembly of the control member are purely mechanical. Operation thereof involves rotary actuation of a grip, thereby generating action in translation on the movable assembly that includes the grip. This movable assembly is mounted on the stick, e.g. a stick used for controlling the collective pitch of a main rotor, and operating the movable assembly does not have any influence on the control generated by the stick as such.

Because of its structure and for the reasons mentioned above, the control member can tend to be robust, ergonomic, practical, and suitable for use in intuitive manner.

The control member can thus be used on board a hybrid helicopter for piloting the thrust exerted collectively by the propellers. Under such circumstances, the grip may for example enable emergency control over the thrust exerted by the propellers. Turning the grip gives rise, via the helical mount, to a helical movement of the grip on the stick so as to assist the pilot in understanding the direction in which thrust is being varied (acceleration towards the front, deceleration towards the rear). Optionally, the turning movement of the grip may also be indexed on the movement of a pointer of an indicator on the instrument panel for indicating thrust.

The control member may also include one or more of the following characteristics.

Thus, the control may include a movement transmission mechanism, said movement transmission mechanism comprising at least one movable link that is mechanically fastened to the movable assembly.

The term "movement transmission mechanism" designates a mechanical system having at least one link capable of being moved at least in part in linear manner. By way of example, such a mechanism may comprise at least one ball control having a blade that is movable in translation, a cable control presenting a cable that is movable in translation, a connecting rod, . . . .

The movement transmission mechanism then extends from an inlet portion that includes a link connected to the movable assembly to an outlet portion. For example, a single link extends from the inlet portion to the outlet portion. The movement in translation of the movable assembly as a result of the grip being turned generates an identical movement in translation of the inlet portion and thus also of the outlet portion. For example, the outlet portion performs a movement in translation over the same amplitude and/or in the same direction as the inlet portion and the movable assembly.

A movement order is thus generated purely mechanically.

In another aspect, the movable assembly may include a block that co-operates with the grip, the grip being hinged to the block via a pivot connection imparting a degree of freedom to the grip to move in rotation relative to the block and around the stick, the block being mounted on the stick by a slideway connection, the grip being mounted to move in rotation relative to the block and being constrained to move in translation with the block, while the block is movable in translation only relative to the stick.

Optionally, the movement transmission mechanism is fastened to the block.

The use of a grip and a block attached to a movement transmission mechanism makes it possible to move the inlet portion of the transmission mechanism that is connected to the block in translation only.

In another aspect, the movable assembly may be for controlling a control actuator requiring a movement of the movable assembly through a control amplitude in order to cover an entire operating range of the control actuator, and when the movable assembly is not in operation the movable assembly is in a centered position between a first abutment and a second abutment, the first abutment and the second abutment being reached by the movable assembly from the centered position as a result of the movable assembly moving in translation through said control amplitude.

The grip may be an emergency control system. Thus, the grip may be made inoperative during certain stages of operation, e.g. except in the event of a failure of a main control interface controlling the control actuator, or except during training stages.

The device then makes it possible to ensure that the movable assembly can control the control actuator over the entire operating range of the control actuator, regardless of the state of the control actuator when the grip is operative.

For example, the grip may be free to move in rotation through a maximum amplitude of plus or minus 270 degrees, thereby giving rise to a movement in translation of the movable assembly of plus or minus 75 millimeters relative to the centered position, and in a predetermined positive movement direction. In other words, and starting from the centered position, turning the grip through 270 degrees in a first direction of rotation causes a movement in translation through 75 millimeters in the first direction in translation. Likewise, starting from the centered position, turning the grip through 270 degrees in a second direction of rotation causes a movement in translation of 75 millimeters in the second direction in translation.

The maximum capacity for movement of the movable assembly is then 150 millimeters, i.e. twice the total working stroke provided for the control actuator.

By way of illustration, the thrust force developed by the pilot may be of the order of 10 decanewtons (daN) at the outlet from the grip.

In another aspect, the stick may extend longitudinally from a proximal end to a free end, the proximal end being provided with a hinge giving the stick a degree of freedom to move in rotation about a pivot axis.

The first direction in translation may go from the proximal end towards the free end.

In particular, where appropriate, the first direction is parallel with the forward direction of advance of the aircraft.

The operation of the control is then intuitive, since moving the movable assembly towards the front of the stick implies varying the longitudinal thrust towards the front of the aircraft (acceleration). Conversely, moving the grip towards the rear involves varying the longitudinal thrust towards the rear (deceleration).

In another aspect, the grip may be arranged between the proximal end and the free end, the grip being independent of the stick so that pivoting the stick about its pivot axis does not give rise to a movement of the grip along the stick.

In addition to a control member, the invention also provides an aircraft. The aircraft is provided with at least one thrust system exerting thrust, the thrust being varied by at least one control actuator, the control actuator being controlled by a movement transmission linkage terminating at the control actuator. The aircraft then includes at least one control member of the invention, the control member being mechanically connected to the movement transmission linkage and being designed to move the movement transmission linkage.

Furthermore, the movement transmission linkage may include at least one piloting actuator, said piloting actuator being controlled by an avionics control interface operable by a pilot.

The term "control interface" designates a member activated by a pilot, such as for example a button or the equivalent, a touch screen, a voice command, . . . .

The term "avionics" means that the control interface generates an electrical, electronic, digital, or optical signal to control a change of state in the actuator, i.e. to control relative movement between two parts of the actuator. For example, the control member may request the actuator to extend or to retract if it is a linear actuator, or a rod to rotate if it is a rotary actuator, or a deformation if it is a piezoelectric actuator.

This control interface may be a main system that is used by default.

Conversely, the control member does not require a change in the state of the piloting actuator, but instead moves the piloting actuator mechanically. The control member may comprise emergency means used in the event of a failure of the control interface or else during training stages.

In another aspect, the aircraft may have two thrust systems having propellers, the thrust exerted by each propeller of a thrust system being controlled by modifying a pitch of the propeller blades, the aircraft includes a control system operable by a pilot to modify the thrusts exerted by the two propellers in different manners, the control member enabling the thrusts exerted by the two propellers to be modified in the same manner, the movement transmission linkage includes at least one mixing unit connected to the control member and to the control system and also to the two propellers, the mixing unit mechanically combining a movement generated by the control member and a movement generated by the control system.

The mixing unit may be of conventional type. For example, the teaching of Document FR 3 027 871 is applicable.

In another aspect, the control member may comprise a movement transmission mechanism that is constrained to move in translation with the movable assembly, and a lever may be hinged firstly to the movement transmission mechanism and secondly to the movement transmission linkage, said lever being movable in rotation about a pivot axis.

A simple lever can act as the interface between the two subsystems, which is simple to implement.

The aircraft may include a plurality of control members each having a movement transmission mechanism connected to the movable assembly of the associated control member, each movement transmission mechanism being hinged to the lever.

By way of example, a pilot control and a copilot control are both of the same type as the control member of the invention. The movable assemblies of both control members are then connected to the same lever. Orders coming from the two control members are thus combined naturally by the common lever.

In another aspect, the pivot axis may lie between two end zones of the lever, and the movement transmission mechanism and the movement transmission linkage may be hinged to the lever between the pivot axis and the same end zone.

Optionally, the lever does not generate a change in direction of a movement.

In another aspect, the aircraft may include a locking system operable by a pilot to lock the lever in normal operation, e.g. for example so long as the control actuator can be operated without operating the grip of the control member.

In normal operation, and thus in nominal operation, the lever is locked in one position. Where appropriate, the lever serves as an anchor point for an electrically operated piloting actuator. In contrast, the lever is unlocked when necessary to enable the control actuator to be controlled by the movable assembly of a control member of the invention.

The locking system may be provided with a mechanical system comprising a locking finger that is movable in translation and an orifice in the lever, the locking finger being engaged in said orifice in order to prevent the lever from pivoting in normal operation and being disengaged from the orifice in order to allow the lever to pivot in manual operation.

The finger may be constrained to move in translation with handle means in order to enable it to be operated by a pilot.

The invention also provides a method for controlling a thrust system for an aircraft of the invention.

According to the invention, the grip is turned in a first direction of rotation in order to make it move in translation along the stick in the first direction in translation in order to increase the thrust exerted by the thrust system, and the grip is turned in a second direction of rotation to make it move in translation along the stick in the second direction in translation in order to reduce the thrust exerted by the thrust system.

Optionally, the aircraft may include an indicator presenting a scale illustrating thrust values, and a pointer pointing to a current thrust value on said scale, said pointer turning in a first movement direction when the thrust increases and in a second movement direction when the thrust decreases, said first direction in rotation being identical to said first movement direction, and said second direction in rotation being identical to said second movement direction.

Operation of the grip can be intuitive in many ways.

Specifically, the grip can move longitudinally in a manner that corresponds to the thrust order given, as mentioned above.

In additional or alternative manner, the grip may move in rotation in a manner that corresponds to the movement of the pointer showing this thrust on an indicator.

For example, turning the grip in a clockwise direction may give rise to the pointer moving in the same clockwise direction.

BRIEF DESCRIPTION OF THE DRAWINGS

The invention and its advantages appear in greater detail from the context of the following description of examples given by way of illustration with reference to the accompanying figures, in which:

FIGS. 1 and 2 are diagrams showing a control member of the invention;

FIG. 3 is a diagram showing a control member having operation that corresponds to the operation of a thrust indicator;

Figure 4:
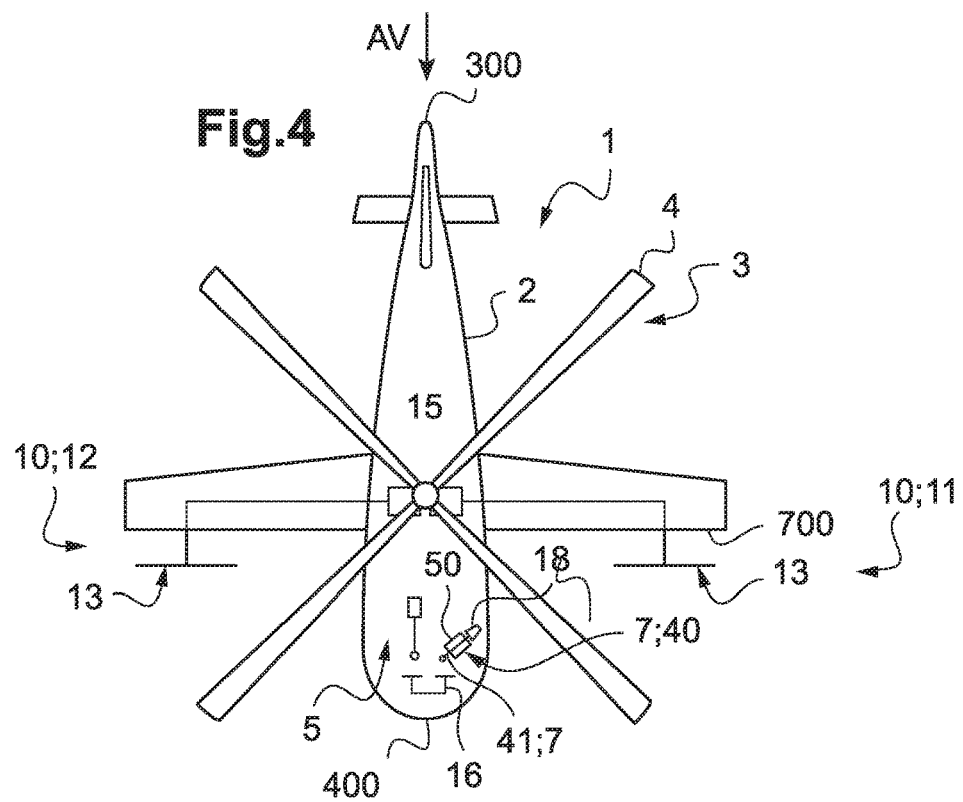
FIG. 4 is a view of an aircraft of the invention.

Elements present in more than one of the figures are given the same reference in each of them.

DETAILED DESCRIPTION OF THE INVENTION

FIG. 1 shows a control member 40 of the invention in three dimensions, and FIG. 2 shows the control member 40 as a kinematic diagram. The control member 40 is for controlling a thrust system 10 that exerts thrust, e.g. in an aircraft 1.

With reference to FIG. 1, the control member 40 comprises a stick 41. The stick 41 extends from an end referred to as the "proximal" end 42 towards an end referred to as the "free" end 43. The proximal end 42 may be hinged to a floor, by a hinge 70. The hinge 70 may impart to the stick 41 a degree of freedom to move in rotation solely about a pivot axis AX2. Thus, the stick 41 may represent a collective pitch lever, with pivoting of the grip operating in conventional manner to modify the collective pitch of blades of a rotor. A collective pitch lever is referred to below as a collective pitch "stick" in order to avoid confusion with an interface lever of the invention.

In addition, the free end 43 may carry various control buttons. In particular, the free end 43 may carry an avionics control interface 18 for controlling said thrust under normal conditions.

Furthermore, the control member presents an additional mechanical control arranged on the stick. This control is in the form of a movable assembly 50 that is arranged on the stick 41 and that is movable in translation along the stick 41.

The movable assembly 50 includes a grip 55. Such a grip 55 may be in the form of a cylinder surrounding the stick.

The grip 55 is linked to the stick 41 via a helical link 57. Such a helical link 57 may include at least two guide members including a helical slot 58 presenting a predetermined screw pitch and a peg 59 sliding in the helical slot 58. One of the two guide members is secured to the stick 41 and the other guide member is secured to the grip 55. For example, a helical slot 58 is formed in a surface of the stick 41 and a peg 59 projects from an inside surface of the grip 55 in order to be received in the helical slot 58. Alternatively, a helical slot 58 is formed in an inside surface of the grip, and a peg 59 projects from the surface of the stick in order to be received in the helical slot in the grip.

Under such circumstances, turning the grip 55 about an extension axis along which the stick 41 extends generates movement in translation of the grip 55 together with the movable assembly 50 along this extension axis. Such an extension axis may be an axis of symmetry of the segment of the stick along which the movable assembly moves.

Furthermore, the grip 55 is independent of the stick 41. Pivoting the stick about its pivot axis AX2 therefore does not give rise to any movement of the grip 55 and of the movable assembly 50 relative to the stick 41.

Furthermore, the control member 40 as shown includes a mechanism 36 for transmitting movement. This movement transmission mechanism 36 is mechanically fastened to the movable assembly 50 in order to transfer an order given by the movable assembly as a result of it moving.

In order to facilitate arranging the movement transmission mechanism, the movable assembly 50 may include a block 60 that co-operates with the grip 55. The grip 55 is then connected to the block 60 via a pivot connection 62 giving the grip 55 a degree of freedom to move in rotation relative to the block 60.

For example the block may be in the form of a box 61 with one end of the grip being arranged therein. This end can move relative to the box 61 solely in rotation about the extension axis (ignoring clearances).

Furthermore, the block 60 is fastened on the stick 41 via a slideway connection 65. The slideway connection 65 may have two guide means including an elongate slot 66 and a peg 67 sliding in the elongate slot 66, one of the two guide means being secured to the stick 41 and the other guide member being secured to the block 60. By way of example, an elongate slot 66 is formed in the stick 41 and a peg 67 is fastened to the block 60 in order to slide in the elongate slot 66. Where appropriate, the elongate slot 66 may run on from the helical slot 58.

Under such circumstances, the grip 55 is movable in rotation relative to the block 60. However, the grip 55 and the block 60 are constrained to move together in translation along the stick 41.

Consequently, a link of the mechanical transmission mechanism 36 is advantageously fastened to the block 60 so as to avoid being subjected to the movement in rotation of the grip 55 and so as to move in translation only.

Under such circumstances, the grip 55 turning in a first direction of rotation 103 can cause the movable assembly 50 to move in translation in a first direction in translation 101, e.g. in order to request an increase in the thrust exerted by the controlled thrust system. Conversely, turning the grip 55 in a second direction of rotation 104 opposite to the first direction of rotation 103 can cause the movable assembly 50 to move in translation in a second direction in translation 102 opposite to the first direction in translation, e.g. in order to request a reduction in said thrust.

The first direction in translation 101 may extend substantially along the direction of advance AV of an aircraft and from the proximal end 42 towards the free end 43. The term "substantially in the direction of advance AV" means that the direction of movement in translation is parallel to a vertical plane containing the direction of advance, and perpendicular to the pitching axis of the aircraft, for example.

Furthermore, and with reference to FIG. 3, the first direction in rotation and the second direction in rotation may correspond to the operation of an indicator 80.

Specifically, the aircraft may include an indicator 80 that presents a scale 81 giving thrust values. Furthermore, the indicator 80 has a pointer 83 that is movable in rotation and that points to a current thrust value on this scale, i.e. a value for the thrust being developed by the thrust systems. The pointer 83 turns in a first movement direction 105 when thrust increases and in a second movement direction 106 when thrust decreases. The second movement direction 106 is opposite to the first movement direction 105.

Under such circumstances, and depending on the method applied, a pilot can turn the grip 55 in the first direction of rotation 103 in order to make it move in translation along the stick 41 in the first direction in translation 101 in order to increase the thrust exerted by the controlled thrust system 10, or can turn the grip 55 in the second direction of rotation 104 in order to make it move in translation along the stick in the second direction in translation 108 in order to reduce the thrust exerted by the controlled thrust system 10.

More precisely, the first direction of rotation 103 may be identical to the first movement direction 105 and the second direction of rotation 104 may be identical to the second movement direction 106.

Operating the movable assembly is thus very intuitive.

Furthermore, the movable assembly can be moved between two extreme positions, and for example between a first abutment 201 and a second abutment 202.

By way of example, when the movable assembly is made inoperative, said movable assembly 50 may be in a "centered" position POS0, not shown in FIG. 1. In this centered position, the movable assembly 50 is at equal distances from the first abutment 201 and the second abutment 202.

If the movable assembly 50 is to control at least one control actuator 14 that requires a movement of the movable assembly 50 through a predetermined control amplitude in order to cover the entire operating range of the control actuator 14, said distance is equal to said control amplitude. Starting from the centered position POS0, the first abutment 201 or the second abutment 202 is reached by the movable assembly 50 after a movement in translation of the movable assembly through said control amplitude.

FIG. 4 shows an aircraft 1 of the invention. The aircraft 1 has at least one control member 40 for controlling at least one thrust system 10. The thrust system exerts thrust enabling the aircraft 1 to be moved.

The aircraft 1 comprises a fuselage 2 that extends longitudinally along a direction of advance AV of the aircraft from a tail 300 to a nose 400.

The aircraft 1 may be a rotorcraft. Under such circumstances, the aircraft has at least one rotor 3 that contributes at least in part to providing the aircraft with lift and possibly also propulsion. Such a rotor 3 may be carried by the fuselage 2. The rotor has a plurality of variable pitch blades 4.

Furthermore, the aircraft also has at least one thrust system suitable for exerting thrust, at least in the direction of advance of the aircraft. For example, the aircraft 1 has two thrust systems 10 provided with two propellers 11, 12. The two propellers 11, 12 may be arranged transversely on opposite sides of the fuselage and they may be carried by a 700.

Each propeller 11, 12 has a plurality of variable pitch blades 13.

The propellers 11, 12 and the rotor 3 may be rotated by a conventional power plant 15. Such a power plant may comprise at least one engine together with various power transmission gearboxes, for example.

In order to be pilotable by a pilot, the aircraft has a cyclic control 5 operable by a pilot to vary the pitch of the blades of the rotor 3 cyclically in conventional manner. The cyclic control 5 may be in the form of a conventional cyclic stick, for example.

In addition, the aircraft has a collective control 7 operable by a pilot to vary the pitch of the blades of the rotor 3 collectively in conventional manner. The collective control may be in the form of a collective pitch stick, for example.

The collective control and the control member 40 may form a single piece of equipment.

In addition, an avionics control interface 18 may enable a pilot to vary collectively the thrust exerted by the propellers, e.g. by varying a mean pitch for the blades of the propellers. Under such circumstances, a control system 16, optionally pedals, may serve for example to vary a differential pitch, so that the pitch of the blades of one propeller is equal for example to the sum of the mean pitch plus half the differential pitch, while the pitch of the blades of the other propeller is equal for example to the difference between the mean pitch and half of the differential pitch.

In this context, the control member 40 of the invention may then represent an emergency system enabling the mean pitch to be controlled in the event of a failure in the avionics control interface 18 or during pilot training, for example. The collective control 7 may then comprise the stick 41 of the control member 40. The avionics control interface may be carried by this stick 41.

Nevertheless, the control member 40 of the invention may also be arranged on other types of aircraft, e.g. in order to control thrust from a jet.

Figure 5:
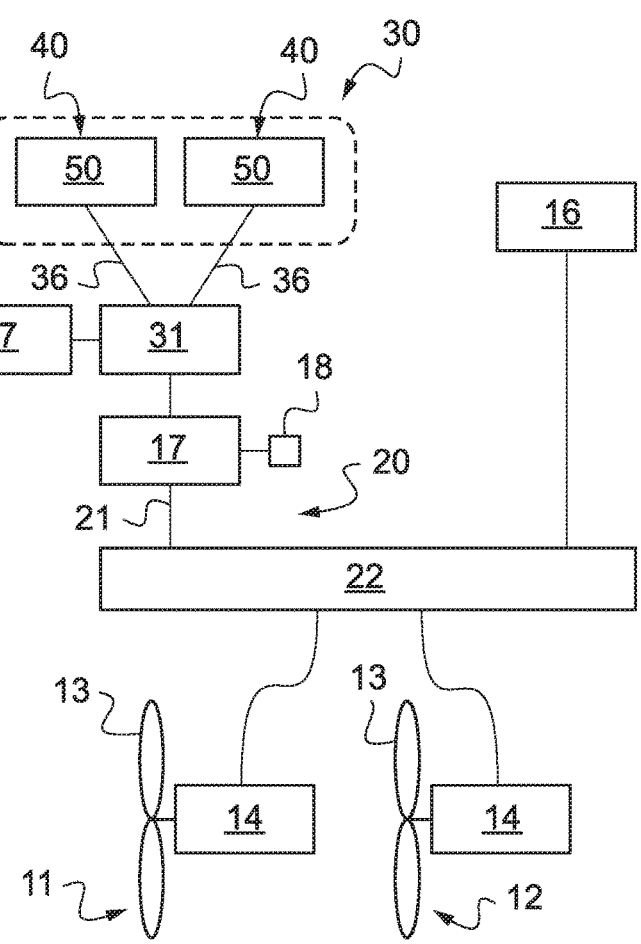
FIGS. 5 and 6 are diagrams showing a control architecture for thrust systems of said aircraft.

FIG. 5 is a diagram showing a piloting architecture on an aircraft of the type shown in FIG. 5.

In this architecture, the pitch of the blades 13 of each propeller can be modified. Thus, the aircraft has an actuator for each propeller, which actuator is referred to for convenience as its "control" actuator 14, and serves to vary the pitch of the associated blades on command.

The control actuators 14 are controlled by a conventional control system referred to for convenience as the "movement transmission linkage" 20. This movement transmission linkage 20 may be controlled by the control system 16 and by the control interface 18.

By way of example, the control interface 18 may be an avionics control generating a signal that is transmitted to at least one actuator 17 of the movement control linkage. Such an actuator is referred to for convenience as a "piloting" actuator.

Under such circumstances, the piloting actuators and the pedals are mechanically connected to a mixing unit 22, the mixing unit 22 being connected to each control actuator 14. The mixing unit 22 may be in the form of a conventional mixing unit.

Furthermore, this architecture presents an emergency mechanical system that can be used in particular in the event of a failure of the control interface 18.

This emergency system includes at least one control member of the invention. FIG. 5 shows the possible presence of a control member 40 that can be operated by a pilot and a control member 40 that can be operated by a copilot.

Each control member 40 has a movable assembly 50 that is movable in translation and that is mechanically connected via a movement transmission mechanism 36 to a single lever 31. This lever 31 is thus hinged firstly to each movement transmission mechanism 36 and secondly to the movement transmission linkage 20.

In addition, the lever co-operates with a locking system 37 that makes the lever 31 inoperative on request.

When the lever is inoperative under normal operating conditions, the lever serves as an anchor point for the piloting actuators 17. A change in the state of the piloting actuators 17 thus gives rise to a movement of the mixing unit. The control member then does not control the control actuators. The movable assemblies of each control member are stationary in their respective reference frames.

In contrast, when the locking system 37 releases the lever 31, a movement in translation of a movable assembly 50 gives rise to a movement of the mixing unit 22.

Figure 6:
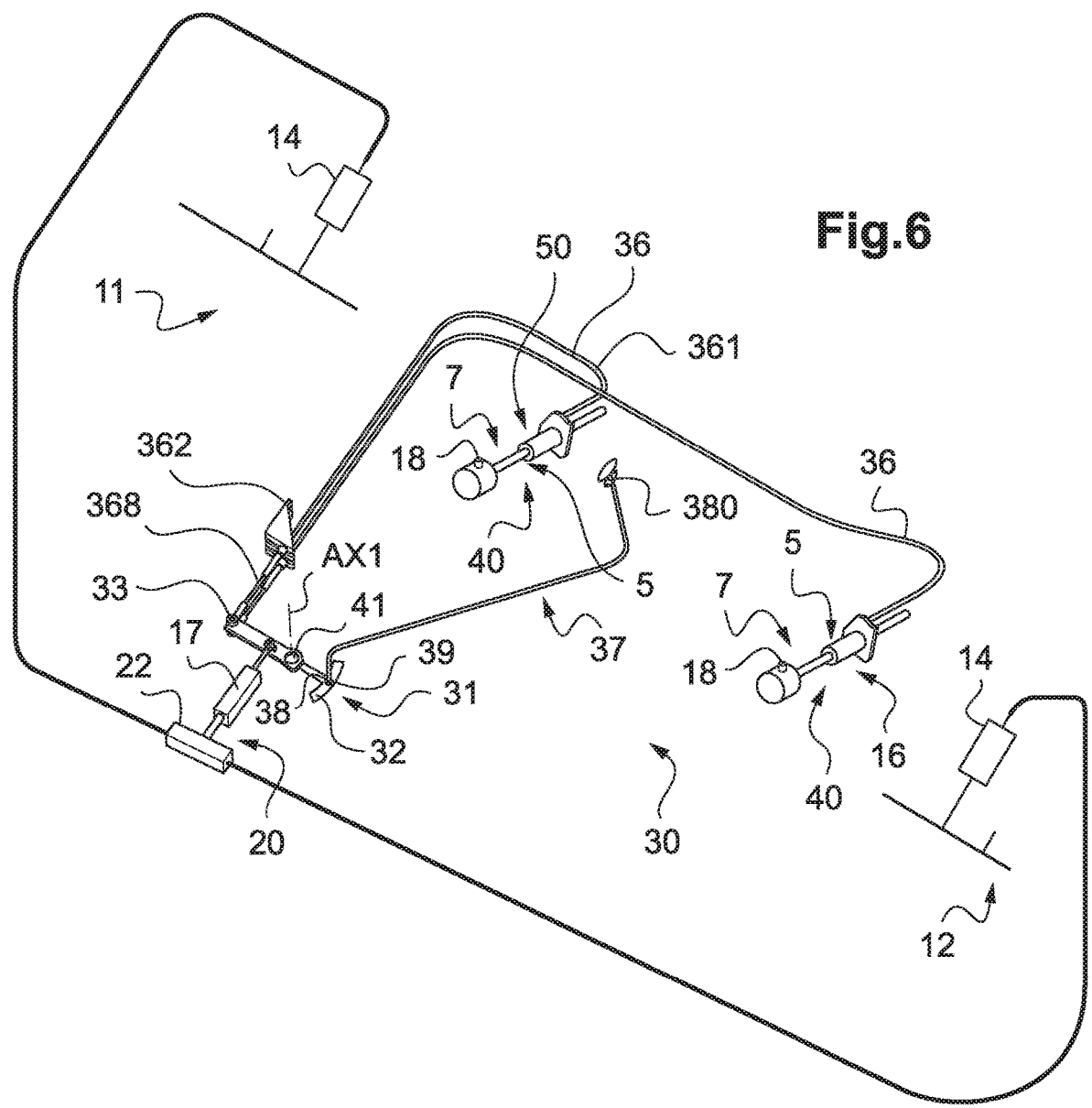

FIG. 6 shows the various members of the FIG. 2 architecture.

In FIG. 6, each movable assembly 50 of the control members 40 is connected to a common lever 31 via a movement transmission mechanism 36. Such a transmission mechanism may comprise a sheath 361 bearing against a support 362. Furthermore, the movement transmission mechanism 36 may have a cable or a blade running along the sheath in order to be fastened to the movable assembly 50 and to the lever 31.

Furthermore, the lever 31 is hinged to a stationary member of the aircraft via a hinge that gives the lever 31 a degree of freedom to move in rotation about a pivot axis AX1. The lever extends widthwise between two end zones 32 and 33, with the pivot axis AX1 being positioned between these two end zones 32 and 33.

Under such circumstances, each movement transmission mechanism 36 is optionally hinged to the lever 31 between the pivot axis AX1 and a particular external zone.

Furthermore, an optional locking system 37 enables the lever 31 to be locked on request. The locking system 37 may have a rod with one end constituting a blocking finger 38. The blocking finger 38 may be inserted in an orifice 39 of the lever 31 in order to prevent pivoting of the lever 31 about its pivot axis AX1. The rod may also include handle means 380. Under such circumstances, a pilot can take hold of the handle means 380 in order to extract the blocking finger from the orifice 39 in order to release the lever 31.

In another aspect, the movement transmission linkage 20 is hinged to the lever 31 between the pivot axis AX1 and the same particular end zone. When the lever 31 is locked by the blocking finger 38, the lever thus serves as an anchor point for the movement transmission linkage.

In the embodiment shown in FIG. 6, the movement transmission linkage 20 includes at least one piloting actuator 17 controlled by a control interface 18 or indeed by an autopilot system. Furthermore, this movement transmission linkage 20 may include links, cranks, a mixing unit 22, . . . . The mixing unit 22 may be connected by ball controls or by links to the control actuators 14. The movement transmission linkage 20 is shown diagrammatically.

Under such circumstances, when the locking system locks the lever 31, the piloting actuators 17 are controlled to change state and to transmit a movement order by a mechanical command connected to each control actuator 14. The lever 31 than isolates the movement transmission linkage from the control members 40.

When a pilot releases the lever 31 by acting on the locking system 37, a movement of the movable assembly 50 causes at least one link of a movement transmission mechanism 36 to move, thereby causing the lever 31 to pivot, and thus moving members of the movement transmission linkage 20, and finally moving respective inputs of the control actuators 14.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A pilot-operated control member, the control member being for controlling a thrust system exerting thrust in an aircraft, the control member comprising a stick and a movable assembly, the movable assembly being arranged on the stick and being movable relative to the stick, the movable assembly including a grip, wherein the grip is linked to the stick by a helical link so that turning the grip about the stick causes the grip and the movable assembly to move in translation along the stick, the grip being movable with the movement in translation both in a first direction in translation and in a second direction in translation that is opposite to the first direction in translation.

2. The control member according to claim 1, wherein the control member includes a movement transmission mechanism, the movement transmission mechanism comprising at least one movable link that is mechanically fastened to the movable assembly.

3. The control member according to claim 2, wherein the movable assembly includes a block that co-operates with the grip, the grip being hinged to the block via a pivot connection giving the grip a degree of freedom to move in rotation relative to the block and around the stick, the block being mounted on the stick by a slideway connection, the block being movable in translation only relative to the stick, the grip being movable in rotation relative to the block and being constrained to move in translation with the block, the movement transmission mechanism being fastened to the block.

4. The control member according to claim 1, wherein the movable assembly controls a control actuator requiring a movement of the movable assembly through a control amplitude in order to cover an entire operating range of the control actuator, and when the movable assembly is not in operation the movable assembly is in a centered position between a first abutment and a second abutment, the first abutment and the second abutment being reached by the movable assembly from the centered position as a result of the movable assembly moving in translation through the control amplitude.

5. The control member according to claim 1, wherein the stick extends longitudinally from a proximal end to a free end, the proximal end being provided with a hinge giving the stick a degree of freedom to move in rotation about a pivot axis, the first direction in translation going from the proximal end towards the free end.

6. The control member according to claim 1, wherein the stick extends longitudinally from a proximal end to a free end, the proximal end being provided with a hinge giving the stick a degree of freedom to move in rotation about a pivot axis, and the grip is arranged between the proximal end and the free end, the grip being independent of the stick so that pivoting the stick about its pivot axis does not give rise to a movement of the grip along the stick.

7. An aircraft having at least one thrust system exerting thrust, the thrust being varied by at least one control actuator, the control actuator being controlled by a movement transmission linkage terminating at the control actuator, wherein the aircraft includes at least one control member according to claim 1, the control member being mechanically connected to the movement transmission linkage and being designed to move the movement transmission linkage.

8. The aircraft according to claim 7, wherein the movement transmission linkage includes at least one piloting actuator, the piloting actuator being controlled by an avionics control interface operable by a pilot.

9. The aircraft according to claim 7, wherein the aircraft has two thrust systems having propellers, the thrust exerted by each propeller of a thrust system being controlled by modifying a pitch of the propeller blades, the aircraft includes a control system operable by a pilot to modify the thrusts exerted by the two propellers in different manners, the control member enabling the thrusts exerted by the two propellers to be modified in the same manner, the movement transmission linkage includes at least one mixing unit connected to the control member and to the control system and also to the two propellers, the mixing unit mechanically combining a movement generated by the control member and a movement generated by the control system.

10. The aircraft according to claim 7, wherein the control member comprises a movement transmission mechanism fastened to the movable assembly, and a lever is hinged firstly to the movement transmission mechanism and secondly to the movement transmission linkage, the lever being movable in pivoting about a pivot axis.

11. The aircraft according to claim 10, wherein the aircraft includes a plurality of control members each having a movement transmission mechanism connected to the movable assembly of the associated control member, each movement transmission mechanism being hinged to the lever.

12. The aircraft according to claim 10, wherein the pivot axis lies between two end zones of the lever, and the movement transmission mechanism and the movement transmission linkage are hinged to the lever between the pivot axis and the same end zone.

13. The aircraft according to claim 10, wherein the aircraft includes a locking system operable by a pilot to lock the lever in normal operation.

14. The aircraft according to claim 13, wherein the locking system is provided with a mechanical system comprising a blocking finger movable in translation and an orifice in the lever, the blocking finger being engaged in the orifice to prevent pivoting of the lever in normal operation, and being disengaged from the orifice in order to allow the lever to pivot in manual operation.

15. A method of controlling a thrust system of the aircraft according to claim 7, wherein the method comprising turning the grip in a first direction of rotation in order to make it move in translation along the stick in the first direction in translation in order to increase the thrust exerted by the thrust system, and turning the grip in a second direction of rotation to make it move in translation along the stick in the second direction in translation in order to reduce the thrust exerted by the thrust system.

16. The method according to claim 15, wherein the aircraft includes an indicator presenting a scale illustrating thrust values, and a pointer pointing to a current thrust value on the scale, the pointer turning in a first movement direction when the thrust increases and in a second movement direction when the thrust decreases, the first direction in rotation being identical to the first movement direction, and the second direction in rotation being identical to the second movement direction.

* * * * *